United States Patent [19]
Yang et al.

[11] Patent Number: 5,976,432
[45] Date of Patent: Nov. 2, 1999

[54] METHOD AND APPARATUS FOR THE CONTINUOUS EXTRUSION OF BLOCK ELEMENTS

[75] Inventors: Vue X. Yang; Mark A. Wessel; Anthony C. Kortenhorn, all of Sheboygan, Wis.

[73] Assignee: Plymouth Products, Inc., Sheboygan, Wis.

[21] Appl. No.: 08/711,090

[22] Filed: Sep. 9, 1996

[51] Int. Cl.[6] .......................... B29C 47/38; C04B 35/00
[52] U.S. Cl. .................. 264/40.3; 264/40.7; 264/105; 264/122; 264/125; 264/211.21; 425/149; 425/208; 425/382.3
[58] Field of Search .................. 264/40.3, 40.5, 264/40.7, 323, 122, 105, 125, 211.21, 211.23; 425/379.1, 382.3, 461, 208, 149

[56] References Cited

U.S. PATENT DOCUMENTS

| | | |
|---|---|---|
| 3,164,375 | 1/1965 | Frenkel . |
| 3,268,633 | 8/1966 | Jansen .................................. 264/105 |
| 3,551,545 | 12/1970 | Overdiep .............................. 264/323 |
| 3,685,804 | 8/1972 | Stansfield . |
| 3,795,386 | 3/1974 | Carter et al. . |
| 3,868,436 | 2/1975 | Ootsuji et al. ....................... 264/40.7 |
| 3,954,366 | 5/1976 | Fields .................................... 425/208 |
| 3,989,433 | 11/1976 | Furman ............................... 264/40.3 |
| 4,184,772 | 1/1980 | Meyer . |
| 4,484,879 | 11/1984 | Heinz et al. .......................... 264/40.5 |
| 4,557,885 | 12/1985 | Kiess et al. ............................ 264/105 |
| 4,942,007 | 7/1990 | Kunimoto et al. .................... 264/122 |
| 5,147,722 | 9/1992 | Koslow ................................. 264/122 |
| 5,189,092 | 2/1993 | Koslow . |
| 5,204,039 | 4/1993 | Miyasaka et al. .................. 425/379.1 |
| 5,249,948 | 10/1993 | Koslow . |
| 5,597,891 | 1/1997 | Nelson et al. ..................... 264/211.21 |
| 5,655,835 | 8/1997 | Pham et al. . |
| 5,694,833 | 12/1997 | Wenger . |

FOREIGN PATENT DOCUMENTS 56907  9/1944  Netherlands .

*Primary Examiner*—Jan H. Silbaugh
*Assistant Examiner*—Mark Eashoo
*Attorney, Agent, or Firm*—Andrus, Sceales, Starke & Sawall

[57] ABSTRACT

A method and apparatus is provided for the continuous extrusion of porous activated carbon block filter elements. The invention includes feeding material into the barrel of a screw extruder and heating the material therein such that the material becomes an agglomerated mass. The agglomerated mass is agitated and compacted into a die where it is cooled to a semi-solidified state. In the semi-solidified state, the material is passed through a cooling tunnel where the material solidifies and the carbon block filter element is formed. A back pressure control device is also included to control pressure in the die.

23 Claims, 3 Drawing Sheets

METHOD AND APPARATUS FOR THE CONTINUOUS EXTRUSION OF BLOCK ELEMENTS

BACKGROUND AND SUMMARY OF THE INVENTION

This invention relates to extruders, and in particular, to a method and apparatus for the continuous extrusion of porous activated carbon block filter elements.

Screw extruders and injection molding machines are well known in the art. A significant disadvantage of the current state of the art methods and devices for the extrusion of composite articles including a resin binder and powdered or granular material is that, as the material flows off the screw and into the die, and begins to cool and harden, the flights extending from the screw create a spiraling "knit mark" along the outer surface of the material. This spiraling "knit mark" along the surface of the material results in a spiraling weak area all along the axial length of the material which extends through the body of the material and which has a lower density and a greater porosity. Product strength and filtering capability are both adversely affected.

In order to compensate for the lower density and the greater porosity along the spiraling weak area of the material, current state of the art methods and devices form the product with a greater overall density. This, in turn, causes higher production costs due to increased material usage, lower production rates, increased wear and tear on the extruder apparatus, and higher power consumption.

Attempts to overcome the disadvantages of current state of the art extrusion methods and devices are disclosed in the Koslow U.S. Pat. No. 5,189,092 and the Koslow U.S. Pat. No. 5,249,948. The Koslow '092 patent and the Koslow '948 patent disclose an apparatus and a method to provide a more uniform extruded product. The Koslow patents disclose passing the pondered material through the extruder barrel by a screw feeder. The material in the extruder is preheated in the barrel by a preheater, and thereafter passed into a die where it is further heated by a heater element to the required processing temperature.

The heating of the material in the die is critical. If the heating of the material flowing through the die is too short, and the flow of the material too fast, it is not possible to transmit the heat required to form a solid object and the material may not solidify properly. On the other hand, if the heating section is too long, the back pressure increases uncontrollably so that the material hardens and locks up the extruder. Furthermore, the cooling of the material must be long enough such that the material retains its structural integrity when it emerges from the die without causing an uncontrolled amount of back pressure that can lead to material lockup.

However, as with other prior art extrusion devices, the flights of the screw create a spiraling "knit-mark" along the outer surface of the extruded block. Hence, the extruded block has a weakened area along its entire axial length. This weakened area, as previously described, has a lower density and a greater porosity.

Therefore, it is a primary object and feature of the present invention to provide a method and apparatus for the continuous extrusion of a block element which eliminates the spiraling "knit mark" along the outer surfaces of the block element.

It is a further object and feature of the present invention to provide a method and apparatus for the continuous extrusion of a block element which reduces the amount of material required, increases production rates, and reduces power consumption.

It is still a further object and feature of the present invention to provide a method and apparatus for the continuous extrusion of a block element which produces a product of uniform density and porosity.

In accordance with the present invention, a method and apparatus are provided for the continuous extrusion of a block element. The apparatus includes a hollow, generally cylindrical barrel extending along a longitudinal axis. The barrel has an input port, a discharge port, and screw receipt cavity therebetween.

A screw is positioned within the screw cavity receipt coaxial with the barrel, and is rotatable about the longitudinal axis. A heater is positioned between the input port and the discharge port for heating the barrel to a predetermined temperature. A die assembly extends the longitudinal axis adjacent to the barrel. The die assembly has an input port in communication with the discharge port of the barrel, and a discharge port. A water cooling jacket is positioned about the die assembly for cooling the die assembly to a predetermined temperature.

The method of the present invention includes providing a premixed material and feeding the material into the barrel. While in the barrel, the material is heated such that the material forms an agglomerated mass. The agglomerated mass is agitated and compacted into the die by a generally flat surface where the helical flight about the screw terminates. The agglomerated mass is cooled so as to form an extruded block.

In order to control the pressure within the die, the die pressure is monitored and the flow rate of the material exiting the die is controlled. This is accomplished passing the extruded block which exits the die between first and second wheels. Thereafter, a braking force is applied to the wheels to limit the flow of material therebetween which, in turn, varies the pressure.

BRIEF DESCRIPTION OF THE PREFERRED EMBODIMENT

The drawings furnished herewith illustrate a preferred construction of the present invention in which the above advantages and features are clearly disclosed as well as others which will be readily understood from the following description of the illustrated embodiment.

DETAILED DESCRIPTION OF THE PREFERRED EMBODIMENT

Figure 1:
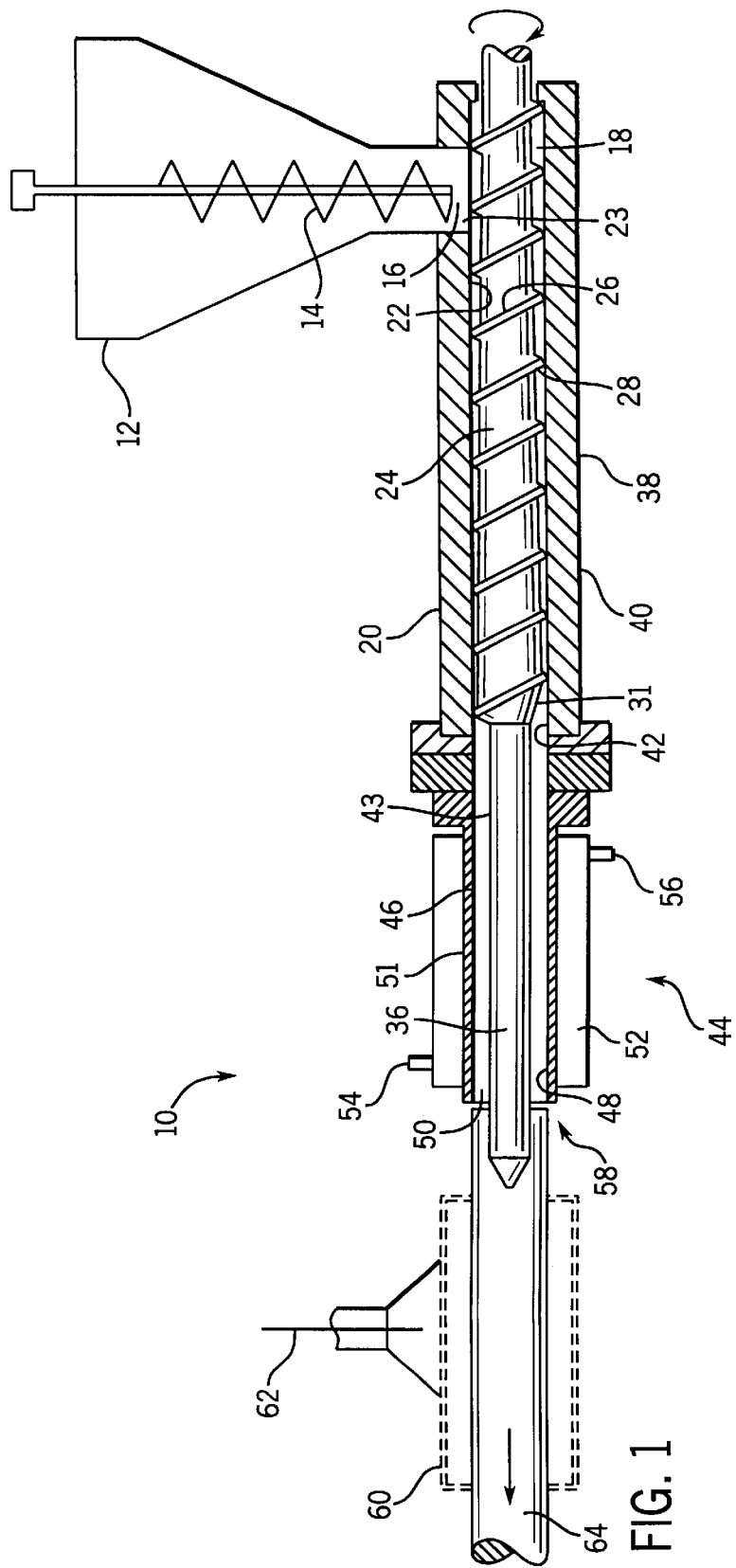
FIG. 1 is a cross sectional view of the apparatus for the continuous extrusion of block filter elements in accordance with the present invention.

Referring to FIG. 1, the extruder apparatus of the present invention is generally designated by the reference numeral 10. In the preferred embodiment, extruder apparatus 10 is designed to continuously extrude porous activated carbon block filter elements formed from a mixture of premixed material such as granular or powdered carbon and a polyolefin binder such as polyethylene. However, it is contemplated as being within the scope of the present invention to provide an extruder apparatus to produce other hollow, composite solid articles from a mixture of other materials.

As best seen in FIG. 1, hopper 12 is provided which is adapted for receiving a mixture therein. The mixture is in the form of a thoroughly mixed powder comprising a thermoplastic binder material, for example, polyethylene, and a powdered or granular primary material such as, for example, activated carbon. Hopper 12 includes a vertical auger 14 which feeds the mixture toward the feed throat 16. The feed throat 16 of hopper 12 communicates with the interior 18 of generally cylindrical barrel 20.

Barrel 20 extends along a longitudinal axis and includes an inner wall 22 which defines the interior 18 of barrel 20 from an upstream input port 23 to an output end 42. A rotatable screw 24 is positioned within the interior 18 of barrel 20 and is coaxial with barrel 20. Screw 24 has an elongated, generally cylindrical core 26 surrounded by a conventional, helical flight 28. The root diameter (core 26) of the screw increases gradually from the input port 23 in the downstream direction.

Figure 3:
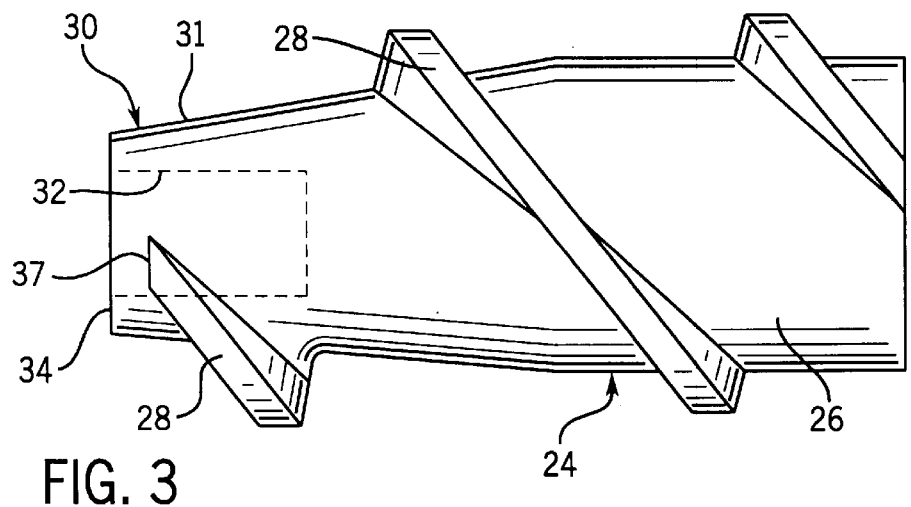
FIG. 3 is an enlarged, side elevational view of a portion of a screw for use with the extruder apparatus of FIG. 1.
Figure 4:
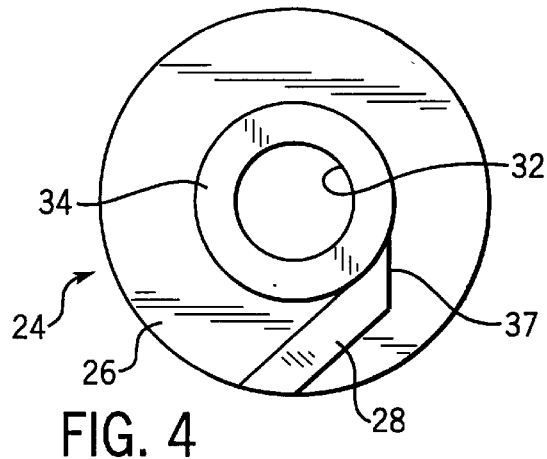
FIG. 4 is an end view of the screw of FIG. 3.

Referring to FIGS. 3 and 4, screw 24 includes a first forward end 30. Forward end 30 of screw 24 is tapered such that the diameter of core 26 is sharply reduced. The taper 31 of the forward end 30 acts to provide a region of increased volume for the heated agglomerated material as it passes from the extruder into the die where the flowing material is further mixed and agitated. Forward end 30 also includes a recessed cavity 32 (shown in phantom) in the forward surface 34 of screw 24 to facilitate the interconnection of the end of a mandrel 36 thereto. Helical flight 28 terminates near the forward end 30 of screw 24 at a surface 37 which is transverse and, preferably, perpendicular to the longitudinal axis along which screw 24 extends.

Figure 5:
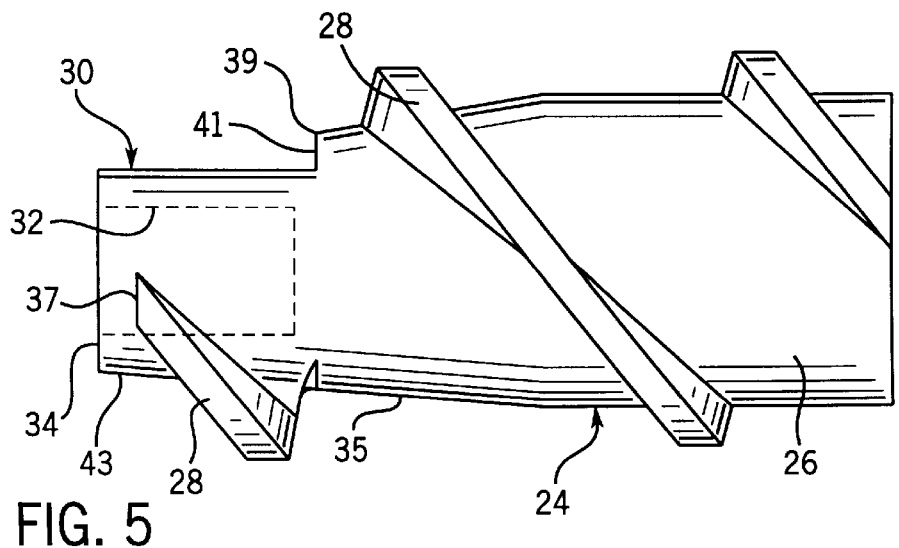
FIG. 5 is an enlarged, side elevational view of an alternate end portion of a screw for use with the extruder apparatus of FIG. 1.

Referring to FIG. 5, a second embodiment of screw 24 is shown. Common reference characters are used to facilitate understanding. Screw 24 includes the first forward end 30. Forward end 30 of screw 24 is tapered such that the diameter of core 26 is gradually reduced. The tapered portion 35 of core 26 terminates at a shoulder 39 which defines a generally flat disk shaped surface 41. The disk shaped surface 41 is spaced from the forward surface 34 of screw 24 by a generally cylindrical portion 43 of core 26.

As is known, the premixed material must be preheated in barrel 20 by preheating element 38 in order that the premixed material remains flowable. The composite material is then further heated by a primary heater 40 to the required processing temperature at or below the resin melting temperature. As the premixed material absorbs heat from the barrel 20, the polyethylene binder becomes soft, partially melts, and starts to create "bridges" between the carbon granules so as to form an agglomerated mass that is forced from the output end 42 of barrel 20.

The output end 42 of barrel 20 feeds into an input end of a die assembly 44. The die assembly 44 includes an elongated die 46 having an inner surface 48 which defines a generally cylindrical passageway 50 therethrough. A water cooling jacket 52 is positioned about the outer periphery 51 of die 46. Water cooling jacket 52 includes a water inlet 54 and a water outlet 56 to provide for the flow of cooling water through water cooling jacket 52. The cooling water is maintained at a temperature below the resin melting temperature.

As hereinafter described, agglomerated mass which enters die assembly partially solidifies therein, and forms an extruded block 64. Extruded block 64 which exits the output end 58 of the die 46 passes through a cooling tunnel 60 positioned adjacent to die 46. Cooling tunnel 60 includes an inlet 62 which receives cool air and passes it over the extruded block 64 in order to completely solidify the final composite product.

Figure 2:
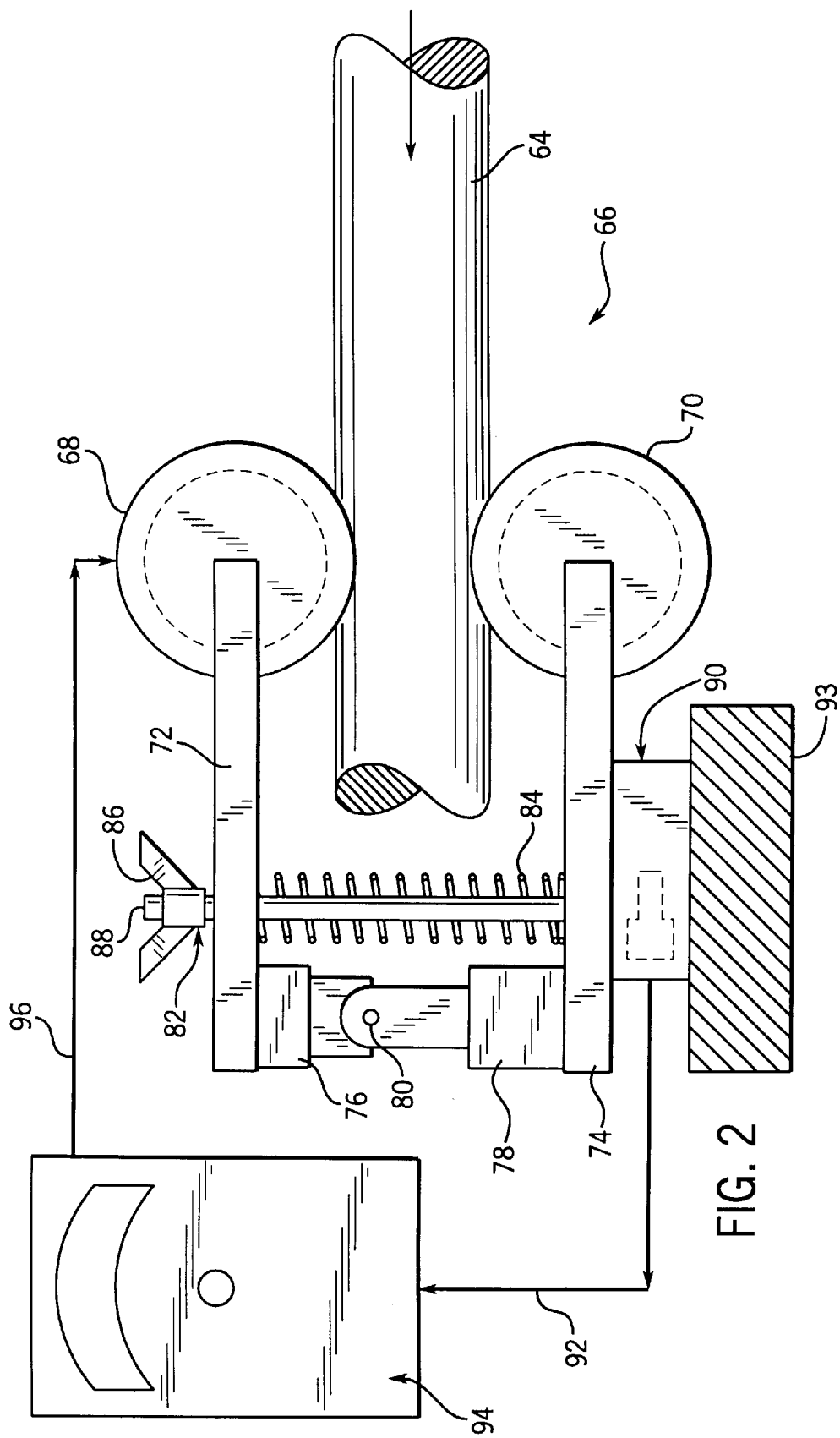
FIG. 2 is a side elevational view of a back pressure control device for controlling the back pressure on the block formed by the extruder apparatus of FIG. 1.

Referring to FIG. 2, in order to control the pressure of material within die 46, a back pressure control device 66 is provided. Back pressure control device 66 provides a resistance to movement of the extruded block 64 from die 46. Back pressure control device 66 includes first 68 and second 70 spaced wheels, which are held in rotational contact with the continuous extruded product 64 as it exits from cooling tunnel 60 at a rate equal to the desired rate of extrusion. In a preferred embodiment, wheels 68 and 70 are constructed from a polturethane or other suitable rubber material and are grooved to conform to the cylindrical surface of the extruded product.

Wheels 68 and 70 are mounted onto corresponding support plates 72 and 74, respectively. Each support plate 72 and 74 includes a support member 76 and 78, respectively, which project therefrom. The support members 76 and 78 are interconnected by a hinge 80 thereby allowing plates 72 and 74 to pivot about hinge 80 so as to vary the vertical space between wheels 68 and 70. A tie rod 82 also interconnects plates 72 and 74. Tie rod 82 includes a spring 84 which biases plate 72 and 74 apart. A wing nut 86 is positioned over a first end 88 of tie rod 82 to provide a selected and adjustable bearing load to be applied through the wheels 68 and 70 to the extrusion moving therebetween.

A load cell 90 is interconnected between plate 74 and a stationary surface 93 for measuring the back pressure force. The load cell 90 provides a signal proportional to the back pressure force along data line 92 to tension controller 94. Tension controller 94, which controls the brake tension on one or both wheels 68 and 70 by an air brake, may be adjusted automatically or by an operator in order to set the back pressure force and to provide a constant back pressure on extruded block 64. Air brake may be controlled by the pressure in brake line 96.

In operation, the premixed material of carbon and polyethylene binder is fed into the hopper 12 at room temperature. Vertical auger 14, turning at a low speed, feeds the premixed material through the feed throat 16 into the interior 18 of barrel 20. As screw 24 rotates, the premixed material moves along the interior 18 of barrel 20 toward forward end 30 of barrel 20. The increasing root diameter of the core 26 of the screw causes the advancing mixture to be compressed and entrapped air to be squeezed from it. The premixed material is preheated by preheater 38 and thereafter by heater 40. The premixed material absorbs heat from barrel 20 such that the polyethylene binder becomes soft, partially melts and starts to create "bridges" between the carbon granules. An agglomerated mass is formed which is urged through the output end 42 of barrel 20 into die assembly 44.

The tapered, reduced diameter forward end 30 of screw 24 allows space for the flowing, premixed material to become mixed and agitated by flight 28, FIG. 3. The surface 37 of flight 28 acts to agitate the agglomerated mass, and to compact the agglomerated mass into the die 44. The agitation and mixing of the material that occurs at the screw end 30 has been found to disrupt the spiral pattern which is imparted to the composite material as it moves along the screw. This process of extrusion allows for the continuous formation of a uniform homogenous extruded product, eliminating the visual spiral marks and spiraling areas of higher and lower density.

In the alternate embodiment of screw 24, the increased space between the cylindrical surface 43 and the inner wall 22 of barrel 20 allows additional space for the flowing, premixed material to become mixed and agitated.

The agglomerated mass is forced into the passageway 50 of die 46 and around the outer periphery of mandrel 36 such that mandrel 36 shapes the inner diameter of the extruded block 64 to be formed. Cooling water is circulated through water cooling jacket 52 so as to remove excess heat from the agglomerated mass thereby forming the extruded block 64. The melting temperature of the resin is typically in the range of 200–500° F. and, therefore, the cooling water may be maintained at any suitable lower temperature, typically in the range of 90–140° F. Extruded block 64 comes out of die 44 with some rigidity. As such, extruded block 64 is passed through cooling tunnel 60 so as to further solidify the extruded block 64 and form the solid end product.

Extruded block 64 then passes between first 68 and second 70 wheels of back pressure control device 66. The back pressure applied to the extruded block 64 controls the density of extruded block 64. Hence, the more back pressure applied on the extruded block 64, the greater its density will be, and vice versa.

As previously described, back pressure in the extrusion process is controlled by the two polyurethane wheels 68 and 70. An operator programs tension controller 94 for a predetermined back pressure force. The compressive force applied by first 68 and second 70 wheels is initially set by adjusting wing nut 86 onto or off of tie rod 85. The compressive force between first 68 and second 70 wheels allow the wheels to grip extruded block 64. Tension controller 94 controls the brake tension on the wheels 68 and 70 by varying the pressure in brake line 96.

The amount of back pressure force on extruded block 64 is controlled by tension controller 94 which is connected to load cell 90 mounted between plate 74 and ground 93. Load cell 90 provides a signal representative of the back pressure force on extruded block 64 and provides the information to tension controller 94 along data line 92 which, in turn, varies the brake tension on first 68 and/or second 70 wheels to maintain a constant back pressure.

Various modes of carrying out the invention are contemplated as being in the scope of the following claims, particularly pointing out and distinctly claiming the subject matter regarded as the invention.

We claim:

1. A method for the continuous extrusion of a porous composite block element from a mixture of a resin binder and a granular base material in a screw extruder having a feed screw rotatably mounted in the cylindrical interior of a barrel, the screw having a helical flight disposed around an axially extending screw core, the core having a diameter which increases in the downstream feed direction along substantially the full length of the barrel, and a die connected to the barrel to receive material from the barrel and form the porous composite block element, said method comprising the steps of:

(1) feeding the mixture in a solid state into the barrel;
    (2) heating the mixture in the barrel to melt the resin binder and cause the mixture to agglomerate;
    (3) rotating the screw to mix and move the mixture through the barrel while compressing the mixture;
    (4) providing a region of increased volume in the barrel at the downstream end of the barrel and upstream of the die to cause increased agitation and disruption of the flow pattern of the mixture, said region of increased volume defined by the cylindrical barrel and a sharply reduced screw core diameter at the end of the screw extending axially along approximately the last pitch length of the helical flight; and
    (5) advancing the agitated material from the region of increased volume directly into the die to form the porous composite block element of uniform density and porosity.

2. The method as set forth in claim 1 wherein the reduced core diameter is formed by tapering the end of the core along approximately the last pitch length of the flight.

3. The method as set forth in claim 1 wherein the reduced core diameter is formed by providing a shoulder defining a reduced diameter cylindrical core end portion.

4. An extrusion device for forming a porous composite block of a resin binder and a granular base material, the resin binder having a predetermined processing temperature, comprising:

a hollow, generally cylindrical barrel extending along a longitudinal axis, the barrel having an input port for the binder and base material and a discharge port;
    a screw having a helical flight extending from a screw core positioned coaxially within the barrel between the input and discharge ports, the screw rotatable about the longitudinal axis, the screw core having a diameter which increases gradually in the direction of the discharge port;
    a heater positioned between the input port and the discharge port for heating the resin binder to the processing temperature;
    a mixing region extending along the length of the helical flight for uniformly mixing and compressing the mixture of the resin binder and the granular base material and an agitating region of increased volume defined by the cylindrical barrel and a sharply reduced screw core diameter at a downstream end of the screw and the barrel at the discharge port of the barrel, the axial length of the reduced diameter screw core end being approximately one pitch length of the flight;
    a die assembly extending along the longitudinal axis adjacent to the barrel, the die assembly having an inlet end in communication with the discharge port of the barrel, and a discharge end for the porous composite block, and being maintained at a lower temperature than the processing temperature of the resin binder; and
    a cooling jacket positioned about the die assembly for cooling the die assembly to said lower temperature.

5. The extrusion device of claim 4 further comprising a hopper extending along an axis perpendicular to the longitudinal axis of the barrel, the hopper having a feed throat in communication with the input port of the barrel.

6. The extrusion device of claim 5 further comprising a vertical auger extending along and rotatable about the axis perpendicular to the longitudinal axis of the barrel.

7. The extrusion device of claim 4 wherein the helical flight terminates at the discharge port in a generally flat surface, transverse to the longitudinal axis of the barrel.

8. The extrusion device of claim, 7 wherein the helical flight of the screw projects from a generally cylindrical core, the core having a downstream end adjacent the discharge port of the barrel and directly upstream of the inlet end of the die.

9. The extrusion device of claim 4 wherein the die assembly includes an extruded block forming cavity positioned between the input end and the discharge end of the die assembly.

10. The extrusion device of claim 9 further comprising a generally cylindrical mandrel extending through the block forming cavity in the die assembly.

11. The extrusion device of claim 4 further comprising a cooling tunnel positioned about and extending along the longitudinal axis adjacent to the die assembly, the cooling tunnel providing for the flow of air therethrough at a predetermined temperature.

12. The extrusion device of claim 4 further comprising a back pressure control device, the back pressure control device including first and second opposed wheels mounted to engage the extruded block emerging from the discharge end of the die, each wheel rotatable about a distinct axis transverse to the longitudinal axis.

13. The extrusion device of claim 12 further comprising a means for varying compressive force between the wheels.

14. The extrusion device of claim 12 further comprising a variable resistance brake for limiting rotation of each wheel.

15. The extrusion device of claim 14 further comprising a means for monitoring the braking resistance and adjusting the braking resistance to a predetermined value.

16. A method for the continuous extrusion of a porous carbon block element, comprising:

provinding a mixture of a powdered carbon base material and resin binder;

transporting the mixture through a barrel of a screw extruder by rotating within the barrel a screw having a core and a continuous helical flight extending substantially the full length of the barrel;

heating the mixture in the extruder barrel to form an agglomerated mass;

compressing the mixture during the transporting and heating steps;

providing a region of increased volume at the downstream end of the barrel defined by an inner barrel surface and a sharply reduced screw core diameter along approximately the last pitch length of the flight for agitating the agglomerated mass within the extruder barrel and disrupting a spiral flow pattern of the mass;

continuously feeding the agglomerated and compacted mass into a die; and cooling the agglomerated mass in the die so as to form the extruded porous carbon block element.

17. The method of claim 16 comprising the additional step of preheating the mixture before heating the same.

18. The method of claim 16 comprising the additional step of feeding the material into a screw extruder barrel having an input port and a discharge port, before the step of heating the material.

19. The method of claim 16 wherein the step of cooling the agglomerated mass includes the steps of:

positioning a water jacket about the die; and passing cooling water through the water jacket.

20. The method of claim 16 wherein the step of cooling the agglomerated mass includes the steps of:

positioning the extruded mass in a cooling tunnel; and passing air at a predetermined temperature over the extruded mass.

21. The method of claim 16 further comprising the additional step of controlling the back pressure within the die.

22. The method of claim 21 wherein the step of controlling the pressure within the die, includes the steps of:

monitoring the back pressure within the die; and varying the rate of flow of material exiting the die.

23. The method of claim 22 wherein the step of varying the flow of material the addition includes the additional steps of:

passing the extruded block between first and second wheels; and applying a braking force to the wheels to limit the speed of passage of the extruded block between the wheels.

* * * * *